United States Patent [19]

Kaliardos

[11] 4,356,036

[45] Oct. 26, 1982

[54] ANTI-CORROSION COATING FOR METALS

[76] Inventor: Nicolas Kaliardos, 10725 Morang Ave., Detroit, Mich. 48224

[21] Appl. No.: 279,865

[22] Filed: Jul. 2, 1981

[51] Int. Cl.³ ............................................. C09D 5/10
[52] U.S. Cl. ................................. 106/1.12; 106/1.17; 106/14.34; 106/14.38; 106/14.39; 106/14.44; 106/230; 106/239; 106/241; 106/271; 106/272; 524/400; 524/438; 524/441; 524/466; 524/488
[58] Field of Search ............... 106/14.29, 14.34, 14.35, 106/14.38, 14.39, 14.43, 14.44, 1.12, 1.17, 230, 239, 241, 271, 272; 524/400, 438, 441, 466, 488

[56] References Cited

U.S. PATENT DOCUMENTS 2,641,551  6/1953  Smith et al. ...................... 106/14.34
2,995,532  8/1981  Cantrell et al. .................. 106/14.34

*Primary Examiner*—Lorenzo B. Hayes
*Attorney, Agent, or Firm*—Barnes, Kisselle, Raisch & Choate

[57] ABSTRACT

An anti-corrosion coating for metals comprising a mixture of aluminum paste or zinc paste, microcrystalline wax, aromatic hydrocarbon resin, chlorinated rubber, neutral barium sulfonate, chlorinated solvent, aromatic hydrocarbon solvent, and mineral spirits.

7 Claims, No Drawings

ANTI-CORROSION COATING FOR METALS

This invention relates to anti-corrosion coatings and particularly such coatings for fabricated steel parts.

BACKGROUND AND SUMMARY OF THE INVENTION

In the manufacture of automobiles and the like, there is a tendency for fabricated metal parts, such as steel parts, to corrode even after painting especially in the inside areas where portions of the metal are folded into close proximity to other portions and not painted.

Accordingly, among the objectives of the invention are to provide anti-corrosion compositions for metal which will protect the metal surfaces against corrosion even when portions of the part are folded on one another.

Basically, the anti-corrosion composition embodying the invention comprises a mixture of aluminum paste or zinc paste, microcrystalline wax, aromatic hydrocarbon resin, chlorinated rubber, natural barium sulfonate, chlorinated solvent, aromatic hydrocarbon solvent and mineral spirits.

Aluminum paste is well known material comprising 65–75% aluminum flake, by weight, and 25–35% solvent such as mineral spirits, by weight. Typical aluminum pastes are sold by Aluminum Company of America under the designations Standard Paste Nos. 6221 and 6240.

Zinc paste is a well known material comprising zinc flake and solvent such as mineral spirits. Typical zinc pastes are sold by United States Bronze Powders, Inc., under the designation Zinc Flake Paste 751.

The term microcrystalline wax is well understood in the art. A typical microcrystalline wax is sold by Shell Chemical Company under the trademark SHELLMAX 500 and has the following properties:

|  | ASTM |  |
| --- | --- | --- |
| Melt Point, °F. | Test Method D-127 | 500 |
|  | D-127 | 141 |
| Color, ASTM | D-1500 | Lt.2.0 |
| Flash Point, C.O.C., °F. | D-92 | 565 |
| Penetration, Needle | D-1321 |  |
| at 77° F. |  | 21 |
| at 100° F. |  | 52 |
| at 110° F. |  | 125 |
| Oil Content, % Wt. | D-721 | 0.9 |
| Refractive Index | D-1747 |  |
| at 100° C. |  | 1.4440 |
| Lbs./Gal. |  |  |
| at 60° F. |  | 7.75 |
| at 210° F. |  | 6.67 |

Another microcrystalline wax that has given satisfactory results is made by Mobil Oil Corporation and sold under the trademarks Mobilwax 2305 and Mobilwax 2305 BR having the following properties:

|  | Mobilwax 2305 | Mobilwax 2305 BR |
| --- | --- | --- |
| Melting Point, °F. (ASTM-127) | 176 | 176 |
| Color, ASTM | 2 | 2.5 |
| Viscosity at 210° F. |  |  |
| SUS | 86 | 160 |
| Needle Penetration |  |  |
| at 77° F. | 27 | 27 |
| at 108° F. | 95 | 95 |
| at 115° F. | 130 | 130 |
| Oil Content, % | 4.0 | 4.0 |
| Flash Point, °F. (COC) | 540 | 540 |
| Wgt./Gal.lbs at 180° F. | 6.71 | 6.71 |
| Wgt./Gal.lbs at 60° F. | 7.74 | 7.74 |

Aromatic hydrocarbon resins are low molecular weight, nonpolar, amber-colored thermoplastic resins produced from petroleum derived monomers. Typical resins are sold by Hercules Incorporated, Wilmington, Del., under the trademark PICCO.

Satisfactory results have been achieved utilizing resins sold by Hercules Incorporated under the trademark PICCO and having the following properties:

|  |  | PICCO RESIN | | | | | | |
| --- | --- | --- | --- | --- | --- | --- | --- | --- |
|  |  | 6070 | 6100 | 6110 | 6115 | 6120 | 6130 | 6140 |
| Softening point, R&B °C. |  | 68–73 | 98–102 | 108–112 | 113–118 | 118–122 | 128–132 | 140–144 |
| Color, Gardner, max |  | 12 | 11 | 11 | 11 | 12 | 12 | 12 |
| Viscosity at 25° C. 70% solids in toluene |  |  |  |  |  |  |  |  |
| Gardner-Holdt |  | E-H | R-U | T-X | V-Y | U-Y | — | — |
| Stokes |  | — | — | — | — | — | 15–27 | 27–55 |
| TYPICAL PROPERTIES |  |  |  |  |  |  |  |  |
| Softening point, R&B °C. |  | 70 | 100 | 110 | 115 | 120 | 130 | 140 |
| Color, Gardner |  | 11 | 9 | 9 | 9 | 11 | 11 | 11 |
| Viscosity at 25° C. 70% solids in toluene |  |  |  |  |  |  |  |  |
| Gardner-Holdt |  | G | T | V | W | X | — | — |
| Stokes |  | — | — | — | — | — | 21 | 38 |
| Acid number |  | <1 | <1 | <1 | <1 | <1 | <1 | <1 |
| Saponification number |  | <1 | <1 | <1 | <1 | <1 | <1 | <1 |
| Bromine number |  | 3.8 | 6.7 | 5.3 | 5.2 | 11.7 | 14.0 | 21.4 |
| Density at 25° C.: | lbs/gal | 8.50 | 8.83 | 8.86 | 8.86 | 8.91 | 8.91 | 8.91 |
|  | kg/L | 1.02 | 1.06 | 1.07 | 1.07 | 1.07 | 1.07 | 1.07 |
| Flash point, COC: | °F. | 460 | 475 | 490 | 500 | 520 | 525 | 530 |
|  | °C. | 237 | 246 | 254 | 260 | 271 | 274 | 277 |
| Melt viscosity, °C.: | 1 poise | 170 | 195 | 205 | 217 | 222 | 229 | 245 |
|  | 10 poises | 135 | 157 | 171 | 178 | 181 | 190 | 205 |
|  | 100 poises | 110 | 133 | 141 | 151 | 154 | 164 | 180 |

Chlorinated rubber is a rubber that contains 66+% combined chlorine. Typical chlorinated rubbers are manufactured by Hercules Incorporated, Wilmington, Del., and sold under the trademark Parlon and having the following properties:

| PROPERTIES | |
|---|---|
| Freezing Point | −9° F.(−23° C.) |
| Pounds per gallon at 25° C. | 13.47 |
| Refractive index at 25° C. | 1.503 |
| Viscosity at 25° C., centipoises | 0.84 |
| Flash Point | none |
| Fire Point | none |
| Heat of vaporization at b.p.: | |
| Cal./g | 50.01 |
| BTU/lb. | 90.2 |
| Specific Heat, cal./g° C. | 0.21 |

*Dow Method of Analysis 59015

The petroleum distillate may be one of the various types preferably having a boiling point ranging from 350° to 380° F.

A typical petroleum distillate is generally known in the trade as Solvent 140. For example, such a solvent is sold by Shell Chemical Company under the designation Shell Sol 140 having the following properties:

| PROPERTY | TEST METHOD | Shell Sol 140 |
|---|---|---|
| Specific Gravity at 60° F. | ASTM D-1250 | 0.786 |
| Gravity, °API | ASTM D-287 | 48.5 |
| Pounds per Gallon at 60° F. | ASTM D-1250 | 6.55 |
| Color, Saybolt | ASTM D-156 | +30 |
| Kauri-Butanol Number | ASTM D-1133 | 31 |
| Aniline Point, °F. | ASTM D-611/D-1012 | 155 |
| Mixed Aniline Point °F. | ASTM D-611/D-1012 | — |
| Flash Point, T.C.C., °F. | ASTM D-56 | 141 |
| Distillation, °F. | ASTM D-86 | |
| IBP | | 370 |
| 10% Recovered | | 371 |
| 30% | | 372 |
| 50% | | 373 |
| 70% | | 375 |
| 90% | | 378 |
| Dry Point | | — |
| End Point | | 408 |
| Evaporation Rate, Seconds | Shell Evapo-Rater | |
| 10% | | 1050 |
| 30% | | 3230 |
| 50% | | 5470 |
| 70% | | 7830 |
| 90% | | 10400 |
| 100% | | 13700 |
| Composition, % Volume | | |
| Paraffins | | 48.4 |
| Naphthenes | | 47.7 |
| Aromatics(total) | | 3.9 |
| Toluene plus Ethyl Benzene | | 0.0 |
| C8 plus Aromatics excluding EB | | 3.9 |

A similar solvent is sold by Grow Solvent Company, Inc., under the designation Solvent GS 140 and has the following properties:

| A.S.T.M. DISTILLATION: | | |
|---|---|---|
| I.B.P. | 363° F. | 183.0° C. |
| 5% | 366 | 185.6 |
| 10% | 367 | 186.1 |
| 20% | 368 | 186.7 |
| 30% | 369 | 187.2 |
| 40% | 370 | 187.8 |
| 50% | 371 | 188.3 |
| 60% | 372 | 188.9 |
| 70% | 373 | 189.4 |
| 80% | 374 | 190.0 |
| 90% | 376 | 191.1 |
| 95% | 379 | 192.8 |
| Dry Point | 383 | 195.0 |
| A.P.I. Gravity at 60° F. | | 51.2° |
| Specific Gravity at 60/60° F. | | 0.7745 |
| Weight Per Gallon at 60° F. | | 6.448 |
| Straight Aniline Point 67.8° C. | | |
| **Kauri Butanol Value | | 29.4 cc |
| Tag Closed Cup Flash Point | | 143° F. |
| Copper Strip Corrosion | | Very Slight Tarnish |

**Corrected to Toluol at 105.0 cc

Chlorinated solvent may comprise any one of the number of well-known solvents such as perchloroethylene.

A typical perchloroethylene is such as sold by The Dow Chemical Company under the designation "Special Vapor Degreasing Grade" having the following specifications and properties:

| SPECIFICATION* | |
|---|---|
| Appearance | Clear, free of sediment and suspended matter |
| Color APHA, Maximum | 15 |
| Distillation Range, at 760, IBP-DP | 118–122° C. |
| Water Content, Maximum Karl Fischer Method, ppm | 30 ppm |
| Non Volatile Matter, Maximum | 25 ppm |
| Free Halogens, Maximum | none |
| Acidity (as HCl) Maximum | none |
| Alkalinity (as NaOH) Maximum | 30 ppm |
| Specific Gravity at 25/25° C. | 1.614–1.622 |
| Acid Acceptance (as NaOH) | |
| by Titration | 0.149–0.176 |
| By Calculation | 0.156–0.190 |
| Stability with Copper | Passes test |

*Dow Method of Analysis 59015

A typical barium sulfonate is manufactured by Witco Chemical Corporation, New York, N.Y., under the trademark Neutral Barium Petronate 50-S and is a synthetic barium sulfonate having the following typical tests:

| | |
|---|---|
| % Barium sulfonate | 50.3 |
| % Barium | 6.9 |
| % Mineral oil | 49.5 |
| % Water | 0.2 |
| Total alkalinity | 3.4 mg KOH/g |
| Saybolt viscosity @ 210° F. | 100 |
| Equivalent weight | |
| as Sodium | 460 |
| as Barium | 1011 |
| ASTM Dilute Color | 1.5 |

The compositions embodying the invention may have the following range of compositions by weight:

| | % |
|---|---|
| Aluminum paste or zinc paste | 15–43 |
| Microcrystalline wax | .5–4 |
| Aromatic hydrocarbon resin | 10–18 |
| Chlorinated rubber | 2–6 |
| Neutral barium sulfonate | .5–1 |
| Chlorinated solvent | 7–23 |
| Aromatic hydrocarbon solvent | 22–32 |

| | % |
|---|---|
| Mineral spirits | 1.3–4 |

The compositions embodying the invention and utilizing aluminum may have the following ranges of composition by weight:

| | % |
|---|---|
| Aluminum paste | 21–28 |
| Microcrystalline wax | 1.3–3.5 |
| Aromatic hydrocarbon resin | 7–23 |
| Neutral barium sulfonate | .5–1 |
| Chlorinated solvent | 7–23 |
| Aromatic hydrocarbon solvent | 23–42 |
| Mineral spirits | 1.3–3.5 |

In the above aluminum compositions, the chlorinated solvent is preferably perchloroethylene and the aromatic hydrocarbon solvents are preferably toluene ranging from 8–14% by weight and xylene ranging from 15–28% by weight.

The compositions embodying the invention and utilizing zinc may have the following ranges of compositions by weight:

| | % |
|---|---|
| Zinc paste | 15–43 |
| Microcrystalline wax | .5–4 |
| Aromatic hydrocarbon resin | 10–18 |
| Neutral barium sulfonate | .5–1 |
| Chlorinated solvent | 7–23 |
| Aromatic hydrocarbon solvent | 23–42 |
| Mineral spirits | 1.9–4 |

In the above zinc compositions, the chlorinated solvent is preferably perchloroethylene and the aromatic hydrocarbon solvents are preferably toluene ranging from 11–16% by weight and xylene ranging from 11–16% by weight.

Specific examples of the compositions are as follows:

| | EXAMPLE 1 | | EXAMPLE 2 | |
|---|---|---|---|---|
| | Weight | Percent | Weight | Percent |
| 6221 Aluminum Paste Pigment | 3 lbs | 23 | 2 lbs | 21 |
| Picco Resin 6140-Flake | 3 lbs | 23 | 2 lbs | 21 |
| Perchloroethylene | 3 lbs | 23 | 2 lbs | 21 |
| Toluene | 1 lb | 8 | 1 lb | 10 |
| Xylene | 2 lbs | 15 | 2 lbs | 21 |
| Wax | 3 oz | 1.5 | 2 oz | 1.3 |
| Mineral Spirits | 3 oz | 1.5 | 2 oz | 1.3 |
| Igepal | 4 drops | | 2 drops | |
| Neutral Barium Petronate | 1 oz | .5 | 1 oz | |
| Parlon S10 | 4 oz | 2 | 2 oz | 1.3 |
| Parlon S20 | 4 oz | 2 | 2 oz | 1.3 |
| Cellusolve Acetate | 4 oz | 2 | | .5 |
| TOTAL | 13 lbs 3 oz | 101% | 9 lbs 6 oz | 99.8% |

| | EXAMPLE 3 | | EXAMPLE 4 | |
|---|---|---|---|---|
| | Weight | Percent | Range | Percent |
| Alcoa Aluminum Pigment | 2 lbs | 23.2 | 2 lbs | 28.3 |
| Picco Resin 6140-Flake | 1 lb 8 oz | 17.4 | 8 oz | 7 |
| Perchloroethylene | 1 lb 8 oz | 17.4 | 8 oz | 7 |
| Toluene | 1 lb | 11.6 | 1 lb | 14.2 |
| Xylene | 2 lbs | 23.2 | 2 lbs | 28.3 |
| Wax | 2 oz | 1.5 | 4 oz | 3.5 |
| Mineral Spirits | 2 oz | 1.5 | 4 oz | 3.5 |
| Igepal | 1 oz | .7 | 0 | 0 |
| Neutral Barium Petronate | 1 oz | .7 | 1 oz | .9 |
| Parlon S10 | 2 oz | 1.5 | 4 oz | 3.5 |
| Parlon S20 | 2 oz | 1.5 | 4 oz | 3.5 |
| TOTAL | 8 lbs 10 oz | 100.2% | 7 lbs 1 oz | 99.7% |

| | EXAMPLE 5 | | EXAMPLE 6 | |
|---|---|---|---|---|
| | Weight | Percent | Range | Percent |
| Zinc Flake | 2 lbs | 23.2 | 2 lbs | 30.2 |
| Perchloroethylene | 2 lbs | 23.2 | 1 lb | 15.1 |
| Xylene | 1 lb | 11.6 | 1 lb | 15.1 |
| Toluene | 1 lb | 11.6 | 1 lb | 15.1 |
| Mineral Spirits | 4 oz | 2.9 | 2 oz | 1.9 |
| 6140 Picco Resin Flake | 1 lb 8 oz | 17.4 | 1 lb | 15.1 |
| Wax | 4 oz | 2.9 | 2 oz | 1.9 |
| Parlon S10 | 4 oz | 2.9 | 2 oz | 1.9 |
| Parlon S20 | 4 oz | 2.9 | 2 oz | 1.9 |
| Neutral Barium Petronate | 1 oz | .7 | 1 oz | .9 |
| Cellusolve Acetate | 1 oz | .7 | 1 oz | .9 |
| TOTAL | 8 lbs 10 oz | 100.0% | 6 lbs 10 oz | 100.0% |

| | EXAMPLE 7 | | EXAMPLE 8 | |
|---|---|---|---|---|
| | Weight | Percent | Range | Percent |
| Zinc Flake | 4 lbs | 31.4 | 6 lbs | 43.1 |
| Xylene | 2 lbs | 15.7 | 2 lbs | 14.3 |
| Toluene | 2 lbs | 15.7 | 2 lbs | 14.3 |
| Perchloroethylene | 1 lb | 7.9 | 1 lb 8 oz | 10.8 |
| Parlon S10 | 8 oz | 3.9 | 6 oz | 2.7 |
| Wax | 8 oz | 3.9 | 1 oz | .5 |
| Neutral Barium Petronate | 2 oz | .9 | 1 oz | .5 |
| Cellusolve Acetate | 2 oz | .9 | 1 oz | .5 |
| 6140 Picco Resin Flake | 2 lbs | 15.7 | 1 lb 8 oz | 10.8 |
| Mineral Spirits | 8 oz | 3.9 | 6 oz | 2.7 |
| TOTAL | 12 lbs 12 oz | 99.9% | 13 lbs 15 oz | 100.2% |

The various compositions heretofore described have been tested and have been found to provide good corrosion resistance on bare steel panels in a salt cabinet for over 360 hours, humidity resistance for over 500 hours, no blistering, partial immersion salt solution resistance for at least 260 hours, partial immersion detergent solution resistance for at least 260 hours, and good adhesion.

The composition embodying the invention is preferably made by first separately mixing a wax emulsion, a chlorinated rubber emulsion, and an aromatic hydrocarbon resin emulsion. In a typical example, the mixing is as follows:

| | Wax Emulsion | |
|---|---|---|
| | Per Gallon | % By Weight |
| Mineral spirits | 4 lbs | 43% |
| Microcrystalline wax (180° F. melting point) | 4 lbs | 43% |
| Perchloroethylene | 16 oz | 11% |
| Neutral Barium Petronate | 4 oz | 2% |
| Igepal | 1 oz | 1% |
| TOTAL | 9 lbs 5 oz | |

Procedure: Heat and emulsify wax in mineral spirits. When dissolved and clear, add perchloroethylene, Igepal and Neutral Barium Petronate. Heat until clear. Cool.

| | Chlorinated Rubber Emulsion | | |
|---|---|---|---|
| | Per Gallon | | % By Weight |
| Parlon S10 | 1 lb | 5.33 oz | 17% |
| Parlon S20 | 1 lb | 5.33 oz | 17% |
| Xylene | 5 lbs | 5.33 oz | 66% |
| TOTAL | 8 lbs | | |

Procedure: Dissolve at room temperature until clear.

| | Aromatic Hydrocarbon Resin Emulsion | |
|---|---|---|
| | Per Gallon | % By Weight |
| Picco 6140 Flake | 1 lb | 50% |
| Perchloroethylene | 1 lb | 50% |
| TOTAL | 2 lbs | |

Procedure: Dissolve at room temperature until clear.

Preparation For Final Composition of Aluminum Anti-Corrosion Wax Type Coating

Place all solvents by weight in container. Place premixed resin emulsion in solvent mixture. Place premixed wax emulsion in solvent mixture. Place premixed Parlon emulsion in solvent mixture. Stir for a maximum of 2 minutes.
Add aluminum pigment and stir. Do not shake.
Add AL 161 Syloid and AL 1 Syloid.
Add cellusolve acetate.

The following results are from tests administered on bare steel:

1. Flash point—not less than 11.7° C. (53° F.).
2. Storage stability—composition remains stable after 6 months at 23.8° C. (75° F.).
3. Sprayability—composition is sprayable without sagging or build up at bottom of panel.
4. High temperature flow point—composition does not sag, separate, or degenerate when exposed to temperatures up to 200° F.
5. Toxicity—composition is not toxic when applied or in the dry state.
6. Viscosity—12-15 seconds in Fisher #2 cup after 10 minute agitation.
7. Salt spray corrosion resistance—withstands 360 hours exposure without base metal corrosion, adhesion loss, blisters or wrinkles.
8. Salt solution partial immersion test—withstands 7 days partial immersion in 5% salt tap water solution in an enclosed jar without corrosion, adhesion loss, blisters, or wrinkles. Immersion jar is placed inside a high-humidity cabinet, 100% relative humidity at 100° F. to maintain constant temperature.
9. Detergent solution partial immersion test—withstands 7 days in solution composed of 10 grams of DuPont #7 car wash compound per gallon of tap water without corrosion, adhesion loss, blisters or wrinkles.
10. Environmental corrosion—withstands 10 cycles without corrosion, adhesion loss, blisters or wrinkles.
11. Humidity resistance—withstands 500 hours humidity exposure. Humidity cabinet is maintained at 100% relative humidity at 100° F. Composition does not develop corrosion, adhesion loss, blisters or wrinkles.
12. Cold impact—withstands 2.8 joules (25 inch pounds) reverse impacts at −30° C. (−20° F.) without showing separation of wax from the substrate.
13. The anti-corrosion coating is removable from any topcoat surface without staining or discoloring the topcoat (painted surface).

The use of perchloroethylene is very important because it cleans and dissolves any oil present on the surface and allows the coating to make good contact with the surface. If bare steel is to be coated, I recommend that it be cleaned with perchloroethylene first. If the surface is contaminated with oil or grease, perchloroethylene will facilitate the adhesion process. The Parlon provides water and detergent resistance and helps prevent rust from starting. The wax and barium sulfonate keep the coating soft and prevent rust and moisture from creeping in. The aluminum pigment forms a protective finishing layer over the other ingredients.

This invention, when properly applied to a clean surface, will provide rust prevention especially in crevices and hard to reach places for all metals. This coating should not be oven dried. Up to 200° F. may be applied to the surface and sagging will not occur. It will air dry in 5-10 minutes at room temperature. This composition is primarily for automobiles, inside the entire body, and especially for crevices, bottoms of doors, around plate glass, behind bumpers, on all frames, and all sheet metal whether galvanized or not. It has an advantage over zinc in that it requires less aluminum pigment and provides equal if not more protection. It provides good protection on bare, zinc-coated, or prime steel. I believe that the above compositions will provide good protection for pre-rusted surfaces such as highway bridges, for steel frames, cracked surfaces between steel frames and cement, and for water towers and other surfaces which retain moisture, detergent residue, or salt and are prone to rust.

I claim:
1. An anti-corrosion coating composition comprising a mixture of aluminum paste or zinc paste containing aluminum or zinc flakes and a solvent, microcrystalline wax, aromatic hydrocarbon resin having a softening point, R and B, of 70° C.-140° C., chlorinated rubber having a combined chlorine content of at least 66%, neutral barium sulfonate, chlorinated solvent, aromatic hydrocarbon solvent and mineral spirits.

2. The anti-corrosion coating composition set forth in claim 1 wherein said composition comprises by weight:

|  | % |
| --- | --- |
| aluminum paste or zinc paste | 15–43 |
| microcrystalline wax | .5–4 |
| aromatic hydrocarbon resin | 10–18 |
| chlorinated rubber | 2–6 |
| neutral barium sulfonate | .5–1 |
| chlorinated solvent | 7–23 |
| aromatic hydrocarbon solvent | 22–32 |
| mineral spirits | 1.3–4 |

3. The anti-corrosion coating composition set forth in claim 1 wherein said composition comprises by weight:

|  | % |
| --- | --- |
| aluminum paste | 21–28 |
| microcrystalline wax | 1.3–3.5 |
| aromatic hydrocarbon resin | 7–23 |
| neutral barium sulfonate | .5–1 |
| chlorinated solvent | 7–23 |
| aromatic hydrocarbon solvent | 23–42 |
| mineral spirits | 1.3–3.5 |

4. The anti-corrosion coating composition set forth in claim 1 wherein said composition comprises by weight:

|  | % |
| --- | --- |
| zinc paste | 15–43 |
| microcrystalline wax | .5–4 |
| aromatic hydrocarbon resin | 10–18 |
| neutral barium sulfonate | .5–1 |
| chlorinated solvent | 7–23 |
| aromatic hydrocarbon solvent | 23–42 |
| mineral spirits | 1.9–4 |

5. The anti-corrosion coating composition set forth in claim 1 wherein said chlorinated solvent comprises perchloroethylene.

6. The anti-corrosion coating composition set forth in claim 1 wherein said aromatic hydrocarbon solvent comprises toluene and xylene.

7. The anti-corrosion coating composition set forth in claim 1 wherein the composition is produced by separately preparing a wax emulsion, a chlorinated rubber emulsion, and an aromatic hydrocarbon resin emulsion and thereafter mixing the several emulsions.

* * * * *